(12) United States Patent
Shi et al.

(10) Patent No.: US 10,869,213 B2
(45) Date of Patent: Dec. 15, 2020

(54) TRANSMISSION STATUS REPORTING APPARATUS AND METHOD AND COMMUNICATION SYSTEM

(71) Applicant: FUJITSU LIMITED, Kawasaki (JP)

(72) Inventors: Yulong Shi, Beijing (CN); Lianhai Wu, Beijing (CN); Meiyi Jia, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/253,063

(22) Filed: Jan. 21, 2019

(65) Prior Publication Data
US 2019/0200251 A1 Jun. 27, 2019

Related U.S. Application Data

(63) Continuation of application No. PCT/CN2016/094383, filed on Aug. 10, 2016.

(51) Int. Cl.
*H04W 24/10* (2009.01)
*H04W 76/00* (2018.01)
(Continued)

(52) U.S. Cl.
CPC ......... *H04W 24/10* (2013.01); *H04L 43/0852* (2013.01); *H04L 43/0894* (2013.01); *H04W 24/08* (2013.01); *H04W 76/00* (2013.01)

(58) Field of Classification Search
CPC ..... H04W 24/10; H04W 24/08; H04W 76/00; H04L 43/0852; H04L 43/0894
See application file for complete search history.

(56) References Cited

U.S. PATENT DOCUMENTS 10,271,243 B2 * 4/2019 Phuyal .................. H04W 28/08
2008/0192689 A1 * 8/2008 Kim ......................... H04Q 7/00
(Continued)

FOREIGN PATENT DOCUMENTS

CN 103428770 A 12/2013
CN 103634299 A 3/2014
(Continued)

OTHER PUBLICATIONS

International Search Report issued by the State Intellectual Property Office of the P.R. China for corresponding International Patent Application No. PCT/CN2016/094383, dated May 3, 2017, with an English translation.

(Continued)

*Primary Examiner* — Ronald B Abelson
(74) *Attorney, Agent, or Firm* — Myers Wolin, LLC

(57) ABSTRACT

This disclosure provides a transmission status reporting apparatus and method and communication system. The method includes: obtaining information on transmission rate difference and/or information on scheduling latency difference between a plurality of radio links; the information on transmission rate difference is obtained based on information on transmission statuses of radio links successfully transmitting PDCP layer data packets, and the information on scheduling latency difference is obtained based on information on transmission statuses of radio links transmitting RRC layer data packets. Hence, an accurate reference basis may be provided for a transmitting device in determining whether a current network is suitable to performing duplication transmission, gains and losses between wasted radio resources and reduced latency in the multi-connection duplication transmission mode may be better weighted, and a more suitable data transmission mode or flow control mode may be configured.

18 Claims, 11 Drawing Sheets

(51) Int. Cl.
H04W 24/08 (2009.01)
H04L 12/26 (2006.01)

(56) References Cited

U.S. PATENT DOCUMENTS

2015/0189551 A1* 7/2015 Ozturk .................. H04W 28/08
2015/0281103 A1   10/2015 Wu
2017/0374579 A1* 12/2017 Wang .................... H04W 28/02

FOREIGN PATENT DOCUMENTS

CN   103731885 A    4/2014
WO   2015/103647 A1  7/2015
WO   2015/119411 A1  8/2015

OTHER PUBLICATIONS

Written Opinion of the International Searching Authority issued for corresponding International Patent Application No. PCT/CN2016/094383, dated May 3, 2017, with an English translation.

* cited by examiner ns or information on scheduling latency difference is critical here.

TRANSMISSION STATUS REPORTING APPARATUS AND METHOD AND COMMUNICATION SYSTEM

CROSS REFERENCE TO RELATED APPLICATIONS

This application is a continuation application of International Application PCT/CN2016/094383 filed on Aug. 10, 2016, the entire contents of which are incorporated herein by reference.

TECHNICAL FIELD

This disclosure relates to the field of communication technologies, and in particular to a transmission status reporting apparatus and a method for the same and a communication system.

BACKGROUND

Issues related to the next-generation wireless communication systems are under study in the 3rd Generation Partnership Project (3GPP) to meet needs of new services. One of the most important services is ultra-reliable and low-latency communications (URLLC). This type of service has high transmission latency and reliability requirements. Existing long-term evolution (LTE) systems are difficult to meet the requirements of such type of service.

In researches of the fifth generation (5G) communication, a method that can significantly improve the transmission reliability and reduce the transmission latency is to transmit identical data packets of the same service simultaneously by using a plurality of radio links, and data transmission reliability may be improved and transmission latency may be lowered by duplication transmission.

The duplication transmission under multiple connections usually adopts the 3C architecture of the dual-connectivity technique, that is, data packets are split in the Packet Data Convergence Protocol (PDCP) layer into two radio links for transmission, and convergence and duplication detection of data are performed at a PDCP layer of a receiving device. When a duplication transmission mode is used, the same PDCP protocol data unit (PDU) is simultaneously distributed to two radio link control (RLC) protocol layers for transmission. The PDCP layer at the receiving device receives only a PDCP PDU that is first successfully transmitted from two radio links, and discards duplicate PDCP PDUs.

In this way, the PDCP layer at the receiving device may receive data packets from the fastest one of the radio links, thereby reducing transmission latency. In addition, redundant transmission in multi-link also improves reliability of the link.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that although duplication transmission in multiple connections can improve reliability and reduce latency, utilization of radio resources is relatively low. In general, in order to further reduce the latency of the URLLC service, it is worthwhile to waste the radio resources by the duplication transmission. However, a gain of the reduced latency brought about by the multi-connection duplication transmission is closely related to such factors as link quality, and load situation, etc. If data rates and signal quality of the two radio links performing duplication transmission differ relatively much, or scheduling latency differs relatively much, then a radio link of relatively poor quality contributes less to the data transmission, and compared to transmission by using a single link of relatively good quality, the gain of the reduced latency brought about by the duplication transmission will become low. In such a case, a network device needs to balance a relationship between the waste of radio resources caused by the duplication transmission and the reduction of latency, and then determines whether the multi-connection duplication transmission mode is suitable in the current radio environment.

However, in an existing dual-connectivity mode, reports on link quality and network load and the like do not accurately reflect the gain of the packet latency in multi-connection duplication transmission. For example, a current network load report can only reflect situation on a quality of service (QoS) class identifier (QCI) level, which is not very accurate. There may still exist a large scheduling latency difference and link quality difference between radio links of the same QCI parameter, which in turn leads to a significant decrease in the gain of the multi-connection duplication transmission. That is, even radio links with the same QCI parameter are not necessarily suitable for performing multi-connection duplication transmission.

Embodiments of this disclosure provide a transmission status reporting apparatus and method and communication system, in which information on transmission rate difference and/or information on scheduling latency difference between a plurality of radio links are/is obtained according to information on transmission statuses of radio links successfully transmitting packet data convergence protocol layer data packets and/or information on transmission statuses of radio links transmitting radio link control layer data packets.

According to a first aspect of the embodiments of this disclosure, there is provided a transmission status reporting method, applicable to a transmitting device for transmitting data packets by using a plurality of radio links, the transmission status reporting method including:

obtaining information on transmission rate difference and/or information on scheduling latency difference between the plurality of radio links; the information on transmission rate difference is obtained based on information on transmission statuses of radio links successfully transmitting packet data convergence protocol layer data packets, and the information on scheduling latency difference is obtained based on information on transmission statuses of radio links transmitting radio link control layer data packets.

According to a second aspect of the embodiments of this disclosure, there is provided a transmission status reporting apparatus, configured in a transmitting device for transmitting data packets by using a plurality of radio links, the transmission status reporting apparatus including:

a difference obtaining unit configured to obtain information on transmission rate difference and/or information on scheduling latency difference between the plurality of radio links;

the information on transmission rate difference is obtained based on information on transmission statuses of radio links successfully transmitting packet data convergence protocol layer data packets, and the information on scheduling latency difference is obtained based on information on transmission statuses of radio links transmitting radio link control layer data packets.

According to a third aspect of the embodiments of this disclosure, there is provided a transmission status reporting method, applicable to a receiving device for transmitting data packets by using a plurality of radio links, the transmission status reporting apparatus including:

in receiving a packet data convergence protocol layer data packet transmitted by a transmitting device via the plurality of radio links, recording a radio link by which the data packet is successfully transmitted;

obtaining information on transmission statuses of radio links successfully transmitting data packets according to a recorded result; and feeding back the information on transmission statuses of radio links successfully transmitting the data packets to the transmitting device, or feeding back information on transmission rate difference between the plurality of radio links and/or information on scheduling latency difference between the plurality of radio links obtained based on the information on transmission statuses of radio links successfully transmitting the data packets.

According to a fourth aspect of the embodiments of this disclosure, there is provided a transmission status reporting apparatus, configured in a receiving device for transmitting data packets by using a plurality of radio links, the transmission status reporting apparatus including:

an information recording unit configured to, in receiving a packet data convergence protocol layer data packet transmitted by a transmitting device via the plurality of radio links, record a radio link by which the data packet is successfully transmitted;

a status obtaining unit configured to obtain information on transmission statuses of radio links successfully transmitting data packets according to a recorded result; and an information feedback unit configured to feed back the information on transmission statuses of radio links successfully transmitting the data packets to the transmitting device, or feed back information on transmission rate difference between the plurality of radio links and/or information on scheduling latency difference between the plurality of radio links obtained based on the information on transmission statuses of radio links successfully transmitting the data packets.

According to a fifth aspect of the embodiments of this disclosure, there is provided a communication system, including:

a transmitting device configured to obtain information on transmission rate difference and/or information on scheduling latency difference between a plurality of radio links; the information on transmission rate difference is obtained based on information on transmission statuses of radio links successfully transmitting packet data convergence protocol layer data packets, and the information on scheduling latency difference is obtained based on information on transmission statuses of radio links transmitting radio link control layer data packets.

An advantage of the embodiments of this disclosure exists in that the information on the transmission rate difference and/or information on scheduling latency difference between a plurality of radio links are/is obtained according to information on the transmission statuses of the radio links successfully transmitting the PDCP layer data packets and/or the information on the transmission statuses of the radio links transmitting the RLC layer data packets. Hence, an accurate reference basis may be provided for the transmitting device in determining whether a current network is suitable to performing duplication transmission, gains and losses between wasted radio resources and reduced latency in the multi-connection duplication transmission mode may be better weighted, and a more suitable data transmission mode or flow control mode may be configured.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In this disclosure, a base station may be referred to as an access point, a broadcast transmitter, a node B, or an evolved node B (eNB), etc., and may include some or all of their functions. In this disclosure, the term "base station" shall be used. Each base station may provide communication coverage for a specific geographical area. And a term "cell" may refer to a base station and/or its coverage area, which is dependent on a context of the term.

In this disclosure, a mobile station or device may be referred to as "a user equipment (UE)". The UE may be fixed or mobile, and may also be referred to as a mobile station, a terminal, an access terminal (AT), a subscriber unit, or a station, etc. The UE may be a cellular phone, a personal digital assistant (PDA), a wireless modem, a wireless communication device, a hand-held device, a lap-top, or a cordless telephone, etc.

In an embodiment, a plurality of radio links may be used between a transmitting device and a receiving device for transmitting data packets, by using, for example, the dual-connectivity duplication transmission mode described above. The transmitting device may be a base station, and the receiving device may be a user equipment; the transmitting device may also be a user equipment, and the receiving device may be a base station; and furthermore, both the transmitting device and the receiving device may be user equipments. However, this disclosure is not limited thereto, and a particular scenario may be determined according to an actual situation.

Embodiment 1

Figure 1:
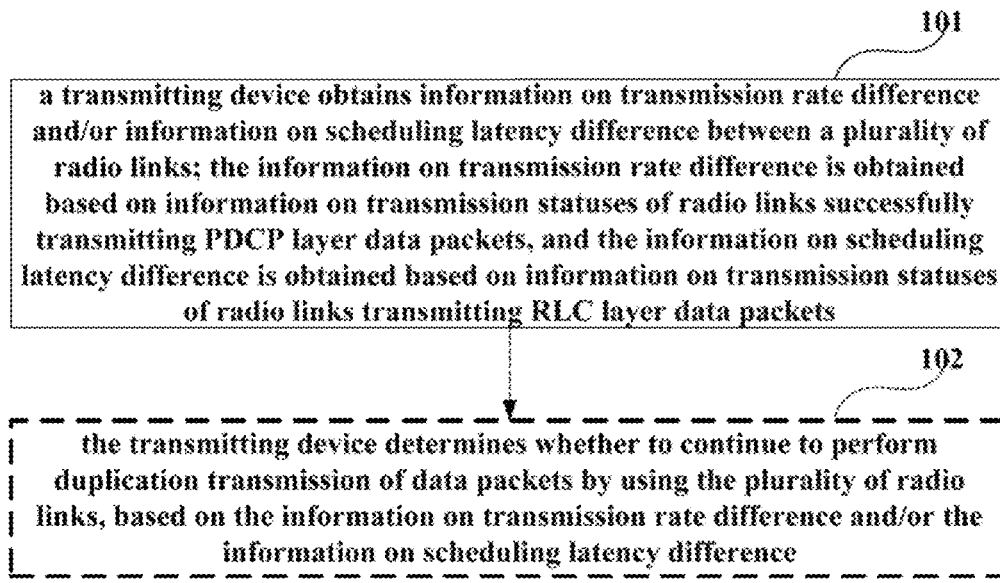
FIG. 1 is a schematic diagram of the transmission status reporting method of Embodiment 1 of this disclosure.

These embodiments of this disclosure provide a transmission status reporting method, applicable to a transmitting device for transmitting data packets by using a plurality of radio links. FIG. 1 is a schematic diagram of the transmission status reporting method of the embodiment of this disclosure, which shall be described from a transmitting side. As shown in FIG. 1, the transmission status reporting method includes:

Block 101: a transmitting device obtains information on transmission rate difference and/or information on scheduling latency difference between a plurality of radio links; the information on transmission rate difference is obtained based on information on transmission statuses of radio links successfully transmitting PDCP layer data packets, and the information on scheduling latency difference is obtained based on information on transmission statuses of radio links transmitting RLC layer data packets.

As shown in FIG. 1, the transmission status reporting method may further include:

Block 102: the transmitting device determines whether to continue to perform duplication transmission of data packets by using the plurality of radio links, based on the information on transmission rate difference and/or the information on scheduling latency difference.

In an embodiment, whether a multi-connection duplication transmission mode is cancelled may be determined according to the information on transmission rate difference and/or the information on scheduling latency difference. However, this disclosure is not limited thereto. For example, whether multi-link split transmission or single-link transmission is performed may be determined according to these pieces of information, in addition, flow controlling may be performed according to these pieces of information, etc.

Following description shall be given by taking whether the plurality of radio links are continued to be used to perform duplication transmission of data packets is determined as an example.

In an embodiment, the information on transmission statuses of radio links successfully transmitting PDCP layer data packets may be obtained via a PDCP layer status report fed back by the receiving device, and the transmitting device obtains the information on transmission rate difference between the plurality of radio links after counting the information on transmission statuses of radio links successfully transmitting PDCP layer data packets.

Alternatively, the receiving device obtains information on transmission rate and/or the information on transmission rate difference between the plurality of radio links after counting the information on transmission statuses of radio links successfully transmitting PDCP layer data packets, and the receiving device feeds back the information on transmission rate and/or the information on transmission rate difference between the plurality of radio links via a PDCP layer status report. Hence, the transmitting device may obtain the information on transmission rate difference between the plurality of radio links.

Alternatively, the receiving device obtains the information on transmission rate and/or the information on transmission rate difference between the plurality of radio links after counting the information on transmission statuses of radio links successfully transmitting PDCP layer data packets, and the receiving device feeds back the information on transmission rate and/or the information on transmission rate difference between the plurality of radio links via radio resource control (RRC) signaling. Hence, the transmitting device may obtain the information on transmission rate difference between the plurality of radio links.

Alternatively, the information on transmission statuses of radio links transmitting RLC layer data packets may be obtained via an RLC layer transmission status indication of the transmitting device itself, thereby obtaining the information on scheduling latency difference between the plurality of radio links.

Thus, by configuring such transmission status reports as the PDCP layer status report, and/or the RLC layer transmission status indication, etc., this disclosure may provide auxiliary information (the information on transmission rate difference and/or the information on scheduling latency difference between the plurality of radio links) to the network, thereby deciding whether the multi-connection duplication transmission mode should be configured or cancelled.

The above cases shall be illustrated below respectively from views of the PDCP layer and the RLC layer.

In an embodiment, the information on transmission statuses of radio links successfully transmitting the data packets may be included in the PDCP layer status report. For example, a radio link by which each successfully transmitted PDCP PDU is transmitted may be indicated in the PDCP layer status report.

Figure 2:
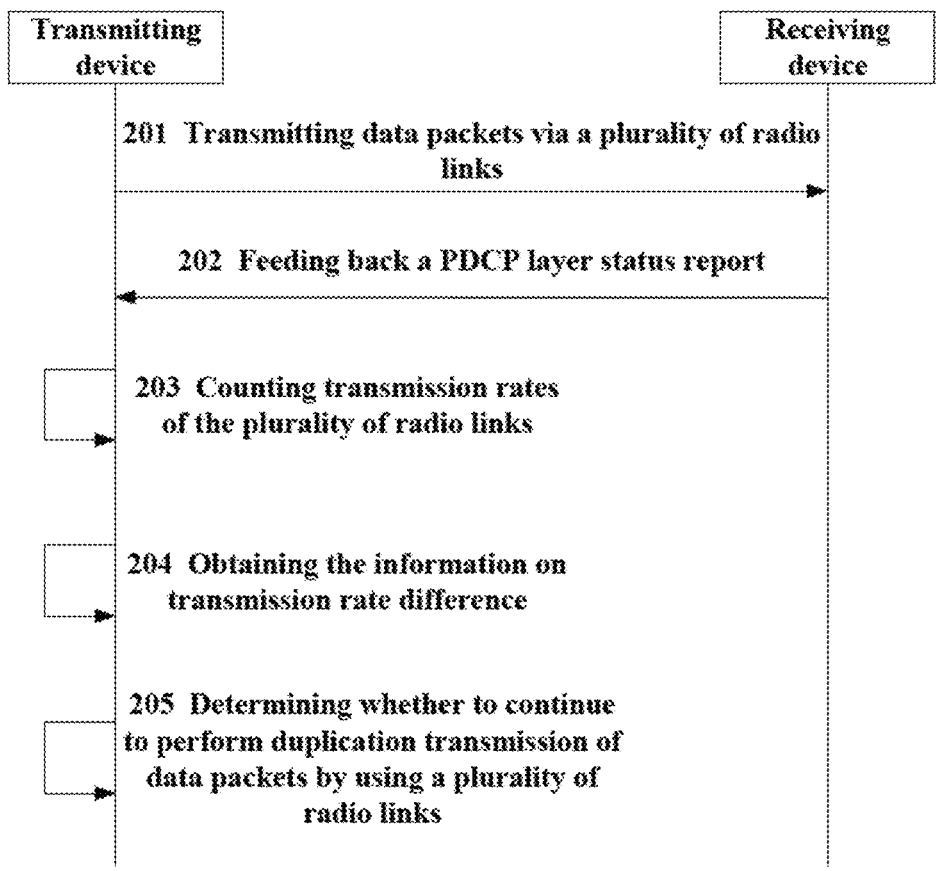
FIG. 2 is another schematic diagram of the transmission status reporting method of Embodiment 1 of this disclosure.

FIG. 2 is another schematic diagram of the transmission status reporting method of the embodiment of this disclosure, which shall be described from a transmitting side and a receiving side. As shown in FIG. 2, the transmission status reporting method includes:

201: a transmitting device transmits data packets to the receiving device via a plurality of radio links.

In this embodiment, when a network side configures that a current multi-connection transmission is of a duplication transmission mode (that is, the PDCP layer of the transmitting device may transmit identical PDCP PDUs to a plurality of radio links), or configures a PDCP status report of multi-connection duplication transmission, a PDCP layer entity at the receiving device performs the following operation: in storing a PDCP PDU, recording an RLC layer entity delivering the PDCP PDU, that is, recording a radio link by which each PDCP PDU is successfully transmitted; the radio link is, for example, a master cell group (MCG) link or a secondary cell group (SCG) link.

202: the transmitting device receives a PDCP layer status report fed back by the receiving device; the PDCP layer status report indicates a radio link by which each data packet is successfully transmitted.

In this embodiment, when the network side configures a periodic PDCP layer status report and a period of the PDCP layer status report is reached, or when the network side configures a polling PDCP layer status report and the PDCP layer data packet received by the receiving device contains a polling indication, the receiving device should construct a PDCP layer status report.

For example, if at least one PDCP service data unit (SDU) is stored, a bitmap field is allocated, with a length being equal to twice the number of PDCP SNs from a first lost PDCP SDU (excluded) to a last out-of-order PDCP SDU (included), rounded off to a next multiple of 8.

In this embodiment, the radio link by which each successfully transmitted data packet is transmitted may be indicated by one or more bits in the bitmap field; it should be noted that the bitmap field in the embodiment of this disclosure may take a form of bit mapping; however, this disclosure is not limited thereto, and other forms may also be adopted.

For example, every two bits in a bitmap correspond to one PDCP SDU; areas in the bitmap field to which all PDCP SDUs that have not been received and indicated by lower layers and any PDCP SDUs failed in decompression correspond may be set to be "00"; and a radio link from which each successfully transmitted PDCP SDU comes is indicated in areas to which all successfully received PDCP SDUs correspond.

For example, if a successfully transmitted PDCP SDU is delivered via link 1 (such as an MCG link), bits to which the SDU corresponds are set to be "01"; and if a successfully transmitted PDCP SDU is delivered via link 2 (such as an SCG link), bits to which the SDU corresponds are set to be "10".

It should be noted that the foregoing only schematically illustrates the bit representations of the unsuccessfully received SDU and the SDUs from different links; however, the bit representation method of this disclosure is not limited to the above, and other bit representation methods shall also be within the scope of this disclosure.

203: the transmitting device counts transmission rates of the plurality of radio links based on the PDCP layer status report.

In this embodiment, after receiving the PDCP layer status report of the multi-connection duplication transmission mode transmitted by the receiving device, the transmitting device may count the number of PDCP PDUs successfully transmitted via different links.

For example, according to the PDCP layer status report, it may be counted that the number of successfully transmitted PDCP PDUs via link 1 (such as an MCG link) is 30, and the number of successfully transmitted PDCP PDUs via link 2 (such as an SCG link) is 3.

204: the transmitting device obtains the information on transmission rate difference between a plurality of radio links according to a counting result.

For example, a ratio of the numbers of PDCP PDUs successfully transmitted between different links (for example, 30/3=10 in the above example), or a difference between the numbers of PDCP PDUs successfully transmitted between different links (for example, 30−3=27 in the above example) may be obtained.

205: the transmitting device determines whether to continue to perform duplication transmission of data packets by using a plurality of radio links, based on the information on transmission rate difference.

For example, when the ratio of the numbers of PDCP PDUs successfully transmitted between different links is greater than a threshold (a preset threshold), or the difference between the numbers of PDCP PDUs successfully transmitted between different links is greater than a threshold, the transmitting device may deem that a gain of the duplication transmission mode is relatively small at this moment, may cancel configuration of the duplication transmission mode, and no longer transmit identical PDCP PDUs by using a plurality of links; and identical data packets may be transmitted by using a link with a relatively good transmission rate only.

In another embodiment, the information on transmission rate of the plurality of radio links and/or the information on transmission rate difference between the plurality of radio links may be included in the PDCP layer status report. For example, information on the number of PDCP PDUs successfully transmitted via different links may be indicated in the PDCP layer status report.

Figure 3:
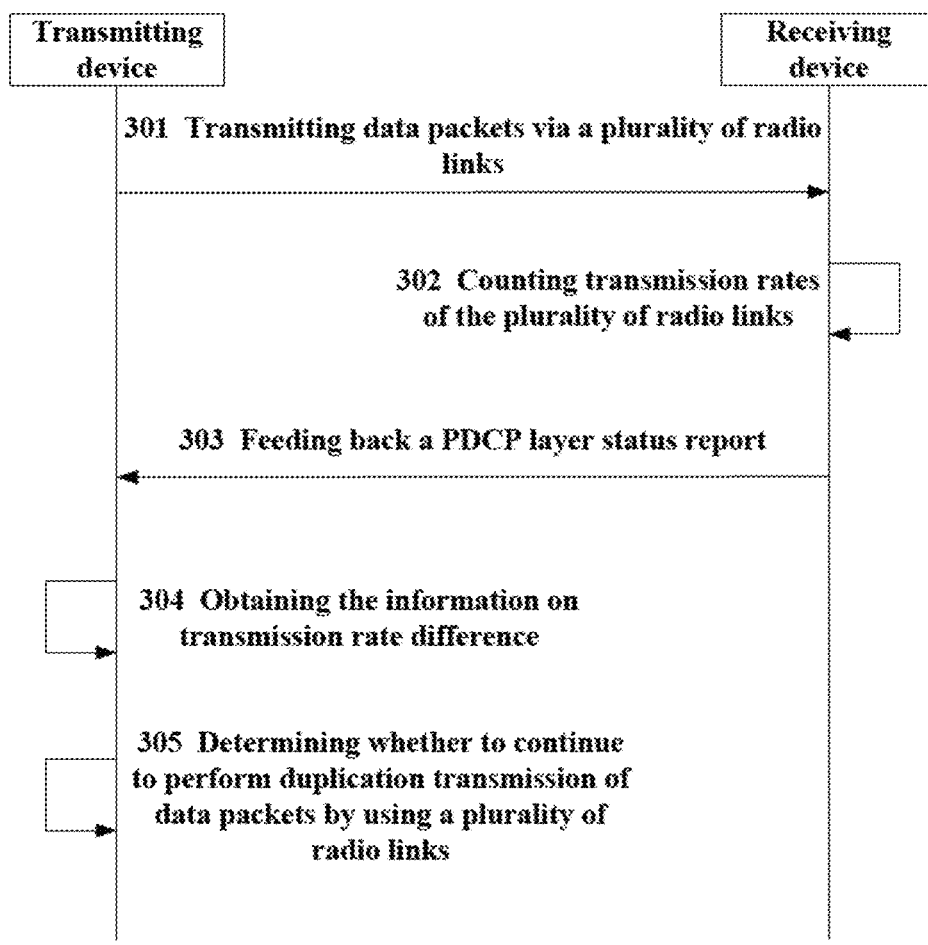
FIG. 3 is a further schematic diagram of the transmission status reporting method of Embodiment 1 of this disclosure.

FIG. 3 is a further schematic diagram of the transmission status reporting method of the embodiment of this disclosure, which shall be described from a transmitting side and a receiving side. As shown in FIG. 3, the transmission status reporting method includes:

301: the transmitting device transmits data packets to the receiving device via a plurality of radio links.

In this embodiment, when the network side configures that a current multi-connection transmission is of a duplication transmission mode, or configures a PDCP status report of multi-connection duplication transmission, a PDCP layer entity at the receiving device performs the following operation: in storing a PDCP PDU, recording an RLC layer entity delivering the PDCP PDU, that is, recording a radio link by which each PDCP PDU is successfully transmitted.

302: the receiving device counts transmission rates of the plurality of radio links.

In this embodiment, the receiving device may count the numbers of PDCP PDUs successfully transmitted via different links; for example, a ratio of the numbers of PDCP PDUs successfully transmitted between different links, or a difference between the numbers of PDCP PDUs successfully transmitted between different links may be obtained; hence, information on the numbers of PDCP PDUs successfully transmitted via different links may be obtained.

303: the receiving device feeds back a PDCP layer status report to the transmitting device; the PDCP layer status report indicates the information on the numbers of PDCP PDUs successfully transmitted via different links.

In this embodiment, when the network side configures a periodic PDCP layer status report and a period of the PDCP layer status report is reached, or when the network side configures a polling PDCP layer status report and the PDCP layer data packet received by the receiving device contains a polling indication, the receiving device should construct a PDCP layer status report.

For example, if at least one PDCP SDU is stored, a bitmap field is allocated, with a length being equal to twice the number of PDCP SNs from a first lost PDCP SDU (excluded) to a last out-of-order PDCP SDU (included), rounded off to a next multiple of 8.

For example, each bit in a bitmap corresponds to one PDCP SDU; areas in the bitmap field to which all PDCP SDUs that have not been received and indicated by lower layers and any PDCP SDUs failed in decompression correspond may be set to be "0"; and for other PDCP SDUs, a corresponding area is set to be "1".

In this embodiment, the PDCP layer status report may include a number-related field, indicating the numbers of data packets successfully transmitted via different links, or indicating a ratio of or a difference between the numbers of data packets successfully transmitted via different links.

For example, "a PDU ratio field" is added to the PDCP layer status report, which indicates a ratio of the numbers of data packets successfully transmitted via different links; or "a PDU number field" is added to the PDCP layer status report, which indicates values of the numbers of data packets successfully transmitted via different links; or "a PDU difference field" is added to the PDCP layer status report, which indicates a difference between the numbers of data packets successfully transmitted via different links.

It should be noted that the foregoing only schematically illustrates the bit representations of the unsuccessfully received SDU and the SDUs from different links; however, the bit representation method of this disclosure is not limited to the above, and other bit representation methods shall also be within the scope of this disclosure.

304: the transmitting device obtains the information on transmission rate difference between a plurality of radio links according to the information on the number; and 305: the transmitting device determines whether to continue to perform duplication transmission of data packets by using a plurality of radio links, based on the information transmission rate difference.

For example, when the ratio of the numbers of PDCP PDUs successfully transmitted between different links is greater than a threshold (a preset threshold), or the difference between the numbers of PDCP PDUs successfully transmitted between different links is greater than a threshold, the transmitting device may deem that a gain of the duplication transmission mode is relatively small at this moment, may cancel configuration of the duplication transmission mode, and transmit identical PDCP PDUs by using a plurality of links no longer; and identical data packets may be transmitted by using a link with a relatively good transmission rate only.

In another embodiment, the information on transmission rate of the plurality of radio links and/or the information on transmission rate difference between the plurality of radio links may be included in an RRC layer signaling.

Figure 4:
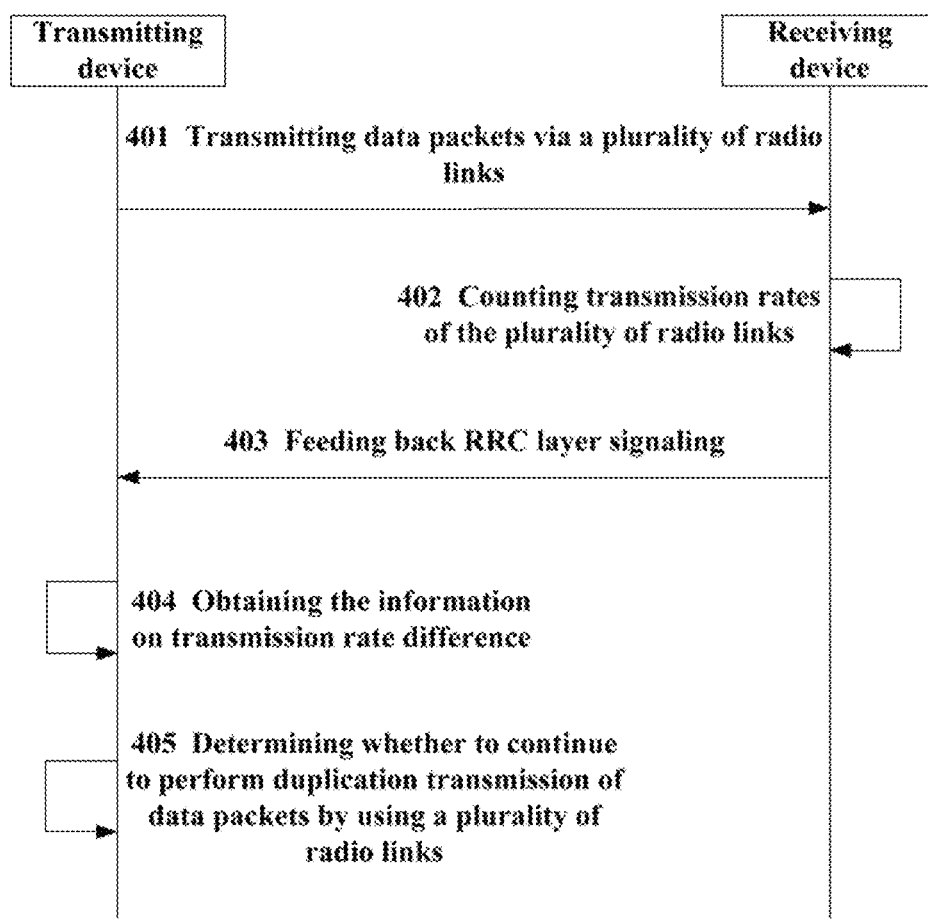
FIG. 4 is yet another schematic diagram of the transmission status reporting method of Embodiment 1 of this disclosure.

FIG. 4 is yet another schematic diagram of the transmission status reporting method of the embodiment of this disclosure, which shall be described from a transmitting side and a receiving side. As shown in FIG. 4, the transmission status reporting method includes:

401: the transmitting device transmits data packets to the receiving device via a plurality of radio links.

In this embodiment, when the network side configures that a current multi-connection transmission is of a duplication transmission mode, or configures a PDCP status report of multi-connection duplication transmission, a PDCP layer entity at the receiving device performs the following operation: in storing a PDCP PDU, recording an RLC layer entity delivering the PDCP PDU, that is, recording a radio link by which each PDCP PDU is successfully transmitted.

402: the transmitting device counts transmission rates of the plurality of radio links.

In this embodiment, the receiving device may count the numbers of PDCP PDUs successfully transmitted via different links; for example, a ratio of the numbers of PDCP PDUs successfully transmitted between different links, or a difference between the numbers of PDCP PDUs successfully transmitted between different links may be obtained; hence, information on the numbers of PDCP PDUs successfully transmitted via different links may be obtained.

403: the receiving device feeds back RRC layer signaling to the transmitting device; the RRC layer signaling includes the information on transmission rate of the plurality of radio links and/or the information on transmission rate difference between the plurality of radio links.

In this embodiment, when a ratio of (or a difference between) the numbers of PDCP PDUs successfully transmitted via different links is greater than a threshold, the receiving device may indicate to the transmitting device via specific RRC layer signaling that the ratio of (or the difference between) the numbers of PDCP PDUs successfully transmitted via different links is greater than a threshold.

Furthermore, in this embodiment, the receiving device may also indicate the ratio of (or the difference between) the numbers of PDCP PDUs successfully transmitted via different links, or the numbers of PDCP PDUs successfully transmitted via different links, via RRC layer signaling.

404: the transmitting device obtains the information on transmission rate difference between a plurality of radio links, based on the RRC layer signaling; and 405: the transmitting device determines whether to continue to perform duplication transmission of data packets by using a plurality of radio links, based on the information transmission rate difference.

For example, when the transmitting device receives an indication transmitted by the receiving device that the ratio of the numbers of PDCP PDUs successfully transmitted between different links is greater than a threshold, or when the difference between the numbers of PDCP PDUs successfully transmitted between different links is greater than a threshold, the transmitting device may deem that a gain of the duplication transmission mode is relatively small at this moment, may cancel configuration of the duplication transmission mode, and transmit identical PDCP PDUs by using a plurality of links no longer; and identical data packets may be transmitted by using a link with a relatively good transmission rate only.

In this embodiment, if the ratio of (or the difference between) the numbers of PDCP PDUs successfully transmitted via different links, or the numbers of PDCP PDUs successfully transmitted via different links, is indicated in the RRC layer signaling, the transmitting device may obtain the transmission rate difference between a plurality of radio links according the RRC layer signaling, and then, based on the transmission rate difference, determine whether to continue to perform duplication transmission of data packets by using a plurality of radio links.

In another embodiment, the information on scheduling latency difference may be obtained based on the information on transmission statuses of the radio links transmitting RLC layer data packets.

Figure 5:
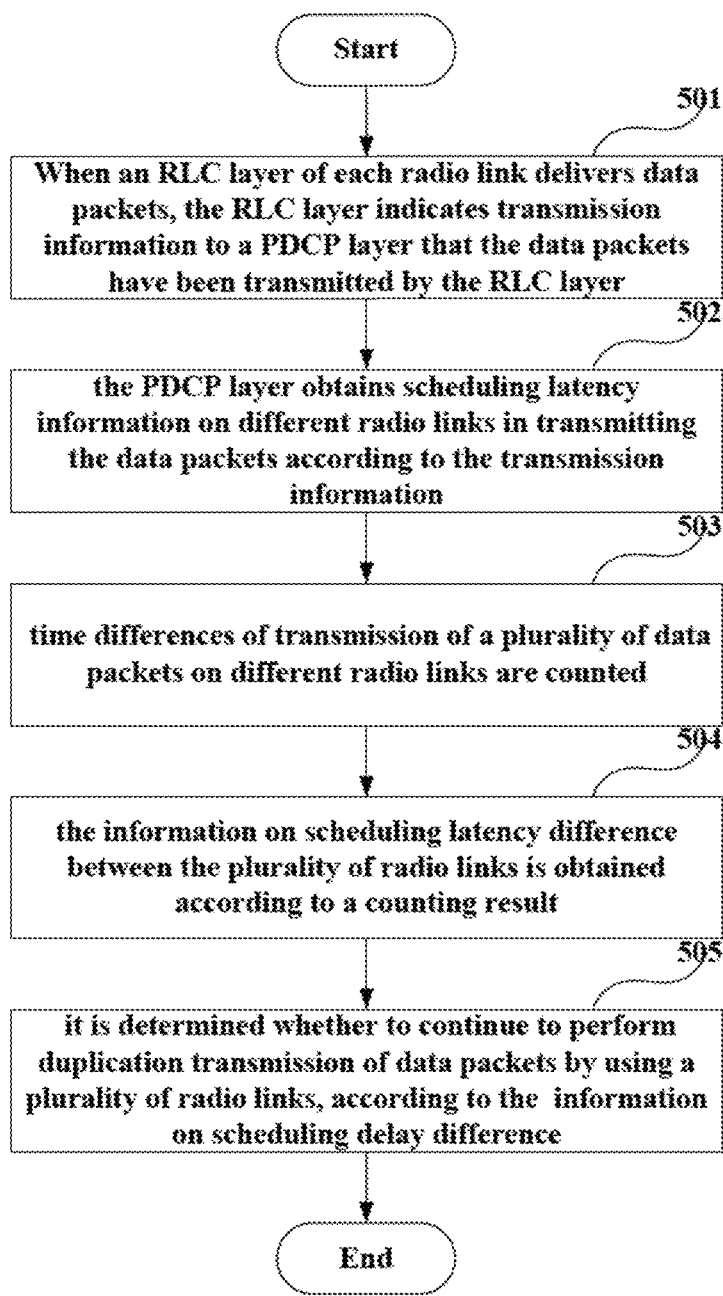
FIG. 5 is still another schematic diagram of the transmission status reporting method of Embodiment 1 of this disclosure.

FIG. 5 is still another schematic diagram of the transmission status reporting method of the embodiment of this disclosure, in which a case where the transmitting device determines a scheduling latency difference according to an RLC layer transmission status indication is shown. As shown in FIG. 5, the transmission status reporting method includes:

Block 501: when an RLC layer of each radio link delivers data packets, the RLC layer indicates transmission information to a PDCP layer that the data packets have been transmitted by the RLC layer.

In this embodiment, an RLC layer entity at the transmitting device performs the following operation that: whenever an RLC PDU is delivered to a lower layer (for example, a media access control (MAC) layer), the RLC layer entity should indicate a situation of a currently transmitted RLC SDU (i.e. a PDCP PDU) to an upper layer (such as a PDCP layer).

Block 502: the PDCP layer obtains scheduling latency information on different radio links in transmitting the data packets according to the transmission information.

In this embodiment, the PDCP layer entity at the transmitting device performs the following operations: receiving transmission status indications of RLC layer entities of different links; recording timings of transmitting the same PDCP PDU at RLC layer entities of different links; and calculating a difference between timings of transmitting each PDCP PDU in different links.

The scheduling latency information on a data packet may be obtained in block 502; and furthermore, block 501 and block 502 may be repeatedly executed to obtain scheduling delay information of a plurality of data packets.

Block 503: time differences of transmission of a plurality of data packets on different radio links are counted.

Block 504: the information on scheduling latency difference between the plurality of radio links is obtained according to a counting result.

In this embodiment, the scheduling delay difference between the plurality of radio links may be obtained according to the counting result, such as an average value of time differences between RLC layers of different links in transmitting identical PDCP PDUs.

Block 505: it is determined whether to continue to perform duplication transmission of data packets by using a plurality of radio links, according to the scheduling delay difference information.

For example, when the average value of time differences between RLC layers of different links in transmitting identical PDCP PDUs is greater than a threshold, the transmitting device may deem that a gain of the duplication transmission mode is relatively small at this moment, may cancel configuration of the duplication transmission mode, and transmit identical PDCP PDUs by using a plurality of links no longer.

Furthermore, the scheduling delay difference obtained by the embodiments of this disclosure may be combined with transmission rate differences obtained by other means (such as by using the relevant art) to determine whether to continue to transmit data packets by using a plurality of radio links or one radio link. For example, when the average value of the time difference between the RLC layers of different links transmitting the same PDCP PDU is greater than a threshold, and/or when the transmission rate difference between different radio links is greater than a threshold, the transmitting device may deem that a gain of the duplication transmission mode is relatively small at this moment, may cancel configuration of the duplication transmission mode, and transmit identical PDCP PDUs by using a plurality of links no longer.

Moreover, the foregoing one or more embodiments may be combined for use. It should be noted that FIGS. 2-5 only schematically show the embodiments of this disclosure; however, this disclosure is not limited thereto. For example, an order of execution of the steps or blocks may be appropriately adjusted; and furthermore, some other steps or blocks may be added, or some of these steps or blocks may be reduced. And appropriate variants may be made by those skilled in the art according to what is described above, without being limited to the disclosure contained in the above figures.

It can be seen from the above embodiments that the information on the transmission rate difference and/or information on scheduling latency difference between a plurality of radio links are/is obtained according to information on the transmission statuses of the radio links successfully transmitting the PDCP layer data packets and/or the information on the transmission statuses of the radio links transmitting the RLC layer data packets. Hence, an accurate reference basis may be provided for the transmitting device in determining whether a current network is suitable to performing duplication transmission, gains and losses between wasted radio resources and reduced latency in the multi-connection duplication transmission mode may be better weighted, and a more suitable data transmission mode or flow control mode may be configured.

Embodiment 2

These embodiments of this disclosure provide a transmission status reporting method, applicable to a communication system for transmitting data packets by using a plurality of radio links. These embodiments shall be described from a receiving device, with contents identical to those in Embodiment 1 being not going to be described herein any further.

Figure 6:
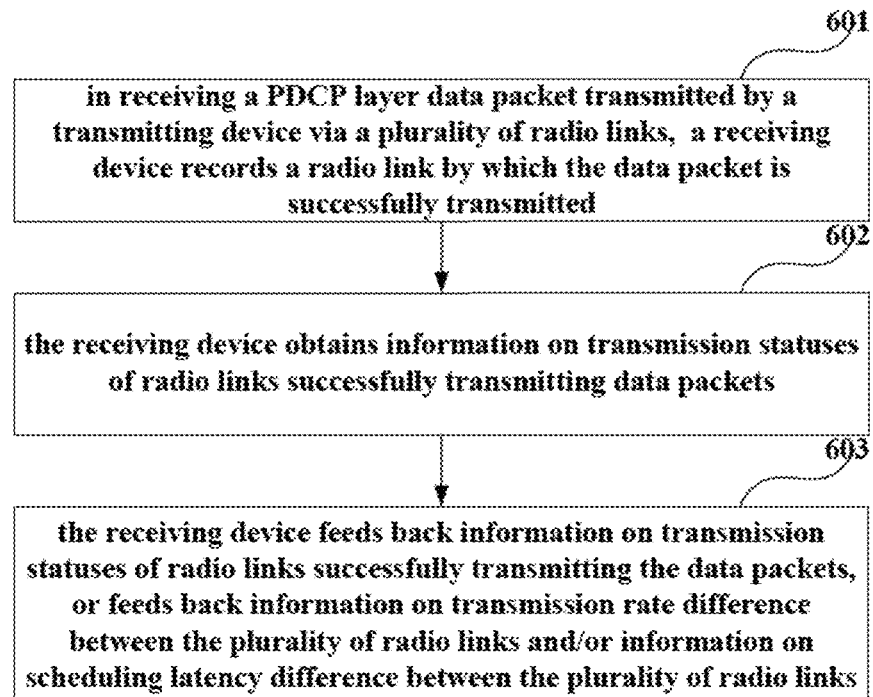
FIG. 6 is a schematic diagram of the transmission status reporting method of Embodiment 2 of this disclosure.

FIG. 6 is a schematic diagram of the transmission status reporting method of the embodiment of this disclosure. As shown in FIG. 6, the transmission status reporting method includes:

Block 601: in receiving a PDCP layer data packet transmitted by a transmitting device via a plurality of radio links, a receiving device records a radio link by which the data packet is successfully transmitted.

Block 602: the receiving device obtains information on transmission statuses of radio links successfully transmitting data packets; and Block 603: the receiving device feeds back the information on transmission statuses of radio links successfully transmitting the data packets, or feeds back information on transmission rate difference between the plurality of radio links and/or information on scheduling latency difference between the plurality of radio links obtained based on the information on transmission statuses of radio links successfully transmitting the data packets, to the transmitting device.

In an embodiment, by feeding back the information by the receiving device, the transmitting device may be made to obtain the information on transmission rate difference between the plurality of radio links and/or the information on scheduling latency difference between the plurality of radio links according to the information, thereby determining whether to continue to perform duplication transmission of the data packets, or perform flow control, or the like, by using the plurality of radio links.

In an embodiment, block 601 may be performed a plurality of times, that is, receiving the PDCP layer data packets a plurality of times; and then, after a plurality of times of transmission of the data packets, the information on transmission statuses of radio links successfully transmitting data packets is obtained in block 602.

In an embodiment, the receiving device may directly feed back the transmission status information to the transmitting device, the transmission status information being carried in the PDCP layer status report, and the receiving device feeds back the PDCP layer status report to the transmitting device.

Alternatively, the receiving device may count the transmission rates of the plurality of radio links according to the transmission status information, obtain information on transmission rate of the plurality of radio links and/or information on transmission rate difference between the plurality of radio links, and then carry the information in the PDCP layer status report and feed back to the transmitting device.

Alternatively, the receiving device may perform count the transmission rates of the plurality of radio links according to the transmission status information, obtain information on transmission rate of the plurality of radio links and/or information on transmission rate difference between the plurality of radio links, and then carry the information in RRC layer signaling and feed back to the transmitting device.

In one embodiment, the transmission status information on the radio links successfully transmitting the data packets may be included in the PDCP layer status report. For example, a radio link by which each successfully transmitted PDCP PDU is transmitted may be indicated in the PDCP layer status report. The PDCP layer status report may include a bitmap field, one or more bits in the bitmap field indicating the radio link by which each successfully transmitted PDCP PDU is transmitted.

In another embodiment, the information on transmission rate of the plurality of radio links and/or the information on transmission rate difference between the plurality of radio links may be included in the PDCP layer status report. For example, information on the number of PDCP PDUs successfully transmitted via different links may be indicated in the PDCP layer status report. The PDCP layer status report may include a number-related field, indicating the numbers of data packets successfully transmitted via different links, or indicating a ratio of or a difference between the numbers of data packets successfully transmitted via different links.

The receiving device may count the transmission rates of the plurality of radio links, obtain radio link-related information indicating successful transmission of data packets based on a counting result, and then carry the radio link-related information in the PDCP layer status report.

In a further embodiment, the information on transmission rate of the plurality of radio links and/or the information on transmission rate difference between the plurality of radio links may be included in RRC layer signaling. For example, the RRC layer signaling may include one or more pieces of the following information: indication information on that the ratio of or a difference between the numbers of data packets successfully transmitted by different radio links is greater than a predetermined threshold; the ratio of or a difference between the numbers of data packets successfully transmitted by different radio links; and the numbers of data packets successfully transmitted by different radio links.

It can be seen from the above embodiments that the information on the transmission rate difference is obtained according to information on the transmission statuses of the radio links successfully transmitting the PDCP layer data packets. Hence, an accurate reference basis may be provided for the transmitting device in determining whether a current network is suitable to performing duplication transmission, gains and losses between wasted radio resources and reduced latency in the multi-connection duplication transmission mode may be better weighted, and a more suitable data transmission mode or flow control mode may be configured.

Embodiment 3

These embodiments of this disclosure provide a transmission status reporting apparatus, configured in a transmitting device for transmitting data packets to a receiving device by using a plurality of radio links, with contents identical to those in Embodiment 1 being not going to be described herein any further.

Figure 7:
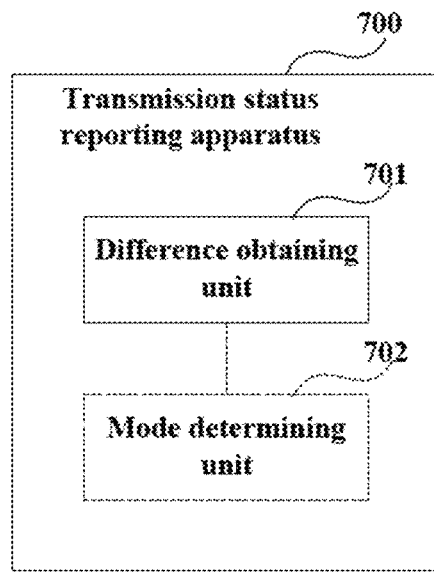
FIG. 7 is a schematic diagram of the transmission status reporting apparatus of Embodiment 3 of this disclosure.

FIG. 7 is a schematic diagram of the transmission status reporting apparatus of the embodiment of this disclosure. As shown in FIG. 7, a transmission status reporting apparatus 700 includes:

a difference obtaining unit 701 configured to obtain information on transmission rate difference and/or information on scheduling latency difference between the plurality of radio links;

the information on transmission rate difference is obtained based on information on transmission statuses of radio links successfully transmitting PDCP layer data packets, and the information on scheduling latency difference is obtained based on information on transmission statuses of radio links transmitting RLC layer data packets.

As shown in FIG. 7, the transmission status reporting apparatus 700 may further include:

a mode determining unit 702 configured to determine whether to continue to perform duplication transmission of the data packets by using the plurality of radio links, based on the information on transmission rate difference and/or the information on scheduling latency difference.

In one embodiment, the information on transmission statuses of radio links successfully transmitting the data packets may be included in a PDCP layer status report fed back by the receiving device.

Figure 8:
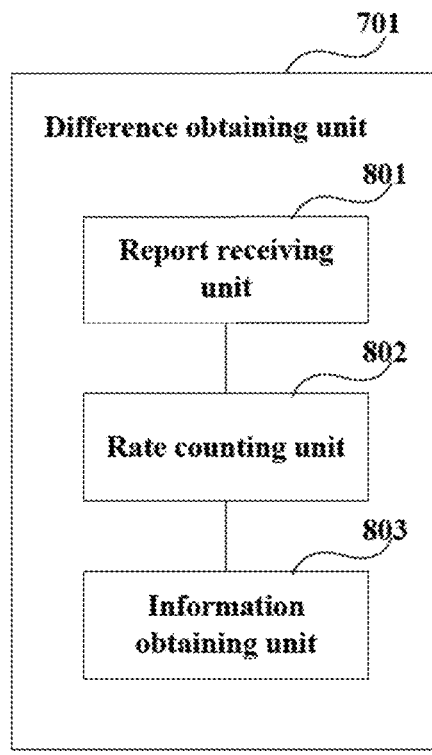
FIG. 8 is a schematic diagram of the difference obtaining unit of Embodiment 3 of this disclosure.

FIG. 8 is a schematic diagram of the difference obtaining unit 701 of the embodiment of this disclosure. As shown in FIG. 8, the difference obtaining unit 701 may include:

a report receiving unit 801 configured to receive a PDCP layer status report fed back by a receiving device, the PDCP layer status report containing the information on transmission statuses of radio links successfully transmitting the data packets;

a rate counting unit 802 configured to count transmission rates of the plurality of radio links based on the PDCP layer status report; and an information obtaining unit 803 configured to obtain the information on transmission rate difference between the plurality of radio links according to a counting result.

In this embodiment, the PDCP layer status report may include: a bitmap field, one or more bits in the bitmap field indicating a radio link by which each of successfully transmitted data packets is transmitted.

In another embodiment, the information on transmission rate of the plurality of radio links and/or the information on transmission rate difference between the plurality of radio links may be included in the PDCP layer status report fed back by the receiving device.

Figure 9:
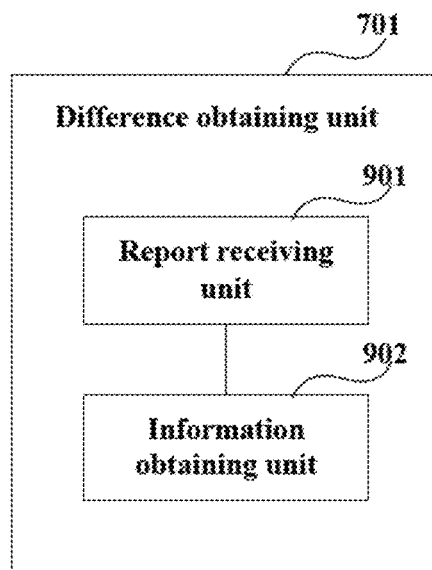
FIG. 9 is another schematic diagram of the difference obtaining unit of Embodiment 3 of this disclosure.

FIG. 9 is a schematic diagram of the difference obtaining unit 701 of the embodiment of this disclosure. As shown in FIG. 9, the difference obtaining unit 701 may include:

a report receiving unit 901 configured to receive a PDCP layer status report fed back by the receiving device, the PDCP layer status report containing the information on the transmission rate of the plurality of radio links and/or the information on transmission rate difference between the plurality of radio links; and an information obtaining unit 902 configured to obtain the information on transmission rate difference between the plurality of radio links according to the PDCP layer status report.

In this embodiment, the PDCP layer status report may include: a number-related field, carrying numbers of data packets successfully transmitted by different radio links, and/or carrying a ratio of or a difference between the numbers of data packets successfully transmitted by different radio links.

In another embodiment, the information on transmission rate of the plurality of radio links and/or the information on transmission rate difference between the plurality of radio links may be included in RRC layer signaling fed back by the receiving device.

Figure 10:
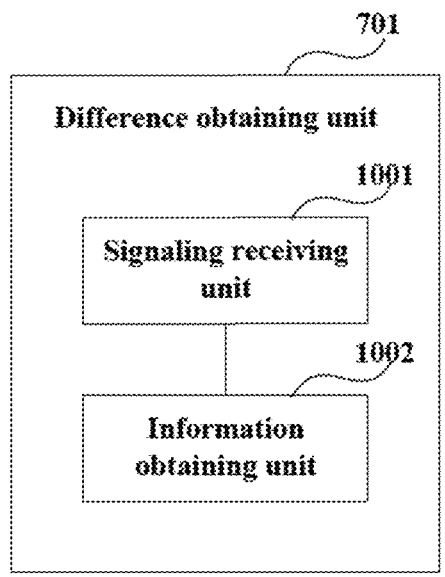
FIG. 10 is a further schematic diagram of the difference obtaining unit of Embodiment 3 of this disclosure.

FIG. 10 is a schematic diagram of the difference obtaining unit 701 of the embodiment of this disclosure. As shown in FIG. 10, the difference obtaining unit 701 may include:

a signaling receiving unit 1001 configured to receive RRC signaling fed back by a receiving device, the RRC signaling including the information on transmission rate of the plurality of radio links and/or the information on transmission rate difference between the plurality of radio links; and an information obtaining unit 1002 configured to obtain the information on transmission rate difference between the plurality of radio links according to the RRC signaling.

In this embodiment, the RRC signaling may include one or more pieces of the following information: indication information on that a ratio of or a difference between the numbers of data packets successfully transmitted by different radio links is greater than a predetermined threshold; the ratio of or the difference between the numbers of data packets successfully transmitted by different radio links; and the numbers of data packets successfully transmitted by different radio links.

In another embodiment, the information on scheduling latency difference between the plurality of radio links may be obtained according to the information on transmission statuses of the radio links transmitting the RLC data packets.

Figure 11:
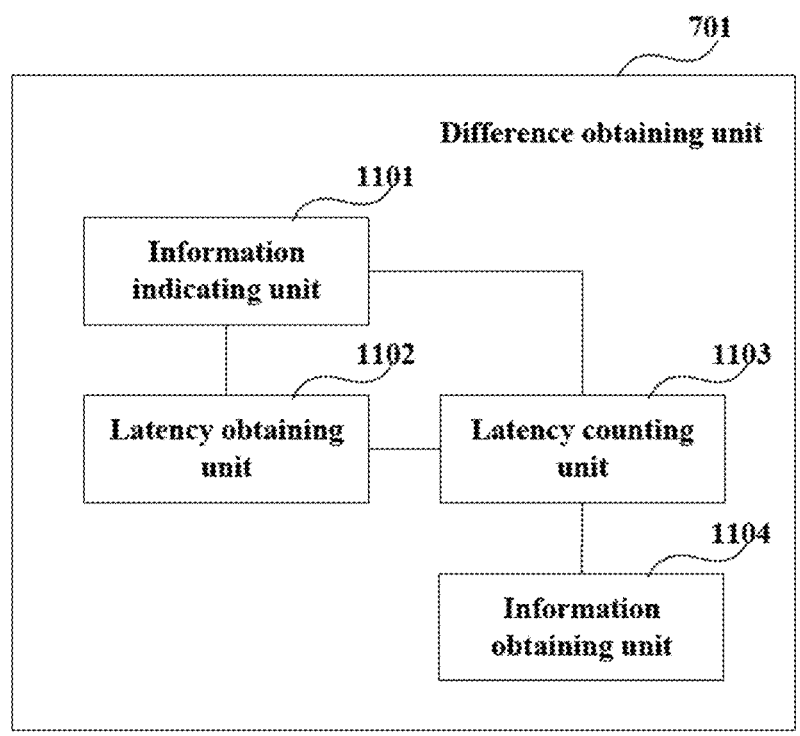
FIG. 11 is yet another schematic diagram of the difference obtaining unit of Embodiment 3 of this disclosure.

FIG. 11 is a schematic diagram of the difference obtaining unit 701 of the embodiment of this disclosure. As shown in FIG. 11, the difference obtaining unit 701 may include:

an information indicating unit 1101 configured to, when a RLC layer of each of the radio links transfers the data packets, indicate a PDCP layer of transmission information on that the data packets have been transmitted by the RLC layer; and a latency obtaining unit 1102 configured to obtain scheduling latency information on different radio links in transmitting the data packets by the PDCP layer according to the transmission information.

As shown in FIG. 11, the difference obtaining unit 701 may further include:

a latency counting unit 1103 configured to count a difference between times of transmitting the plurality of data packets in the different radio links; and an information obtaining unit 1104 configured to obtain the information on scheduling latency difference between the plurality of radio links according to a counting result.

It should be noted that the components related to this disclosure are only shown in the above figures. However, this disclosure is not limited thereto; for example, other components may be included, and reference may be made to related techniques.

It can be seen from the above embodiments that the information on transmission rate difference and/or information on scheduling latency difference between a plurality of radio links are/is obtained according to information on the transmission statuses of the radio links successfully transmitting the PDCP layer data packets and/or the information on the transmission statuses of the radio links transmitting the RLC layer data packets. Hence, an accurate reference basis may be provided for the transmitting device in determining whether a current network is suitable to performing duplication transmission, gains and losses between wasted radio resources and reduced latency in the multi-connection duplication transmission mode may be better weighted, and a more suitable data transmission mode or flow control mode may be configured.

Embodiment 4

These embodiments of this disclosure provide a transmission status reporting apparatus, configured in a receiving device for transmitting data packets by using a plurality of radio links, with contents identical to those in Embodiment 2 being not going to be described herein any further.

Figure 12:
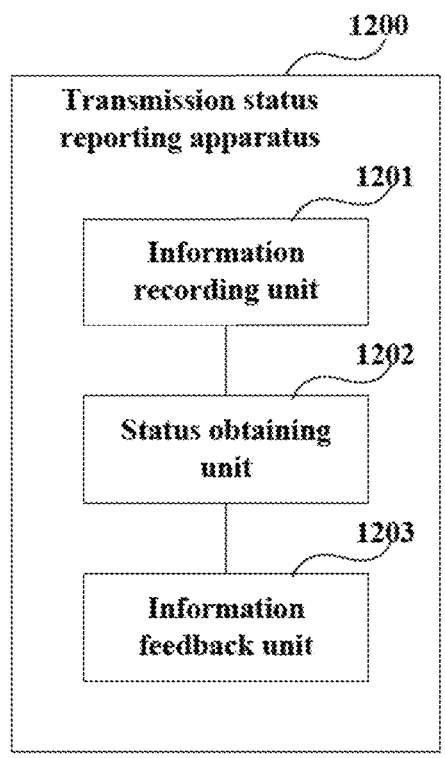
FIG. 12 is a schematic diagram of the transmission status reporting apparatus of Embodiment 4 of this disclosure.

FIG. 12 is a schematic diagram of the transmission status reporting apparatus of the embodiment of this disclosure. As shown in FIG. 12, a transmission status reporting apparatus 1200 includes:

an information recording unit 1201 configured to, in receiving a packet data convergence protocol layer data packet transmitted by a transmitting device via the plurality of radio links, record a radio link by which the data packet is successfully transmitted;

a status obtaining unit 1202 configured to obtain information on transmission statuses of radio links successfully transmitting the data packets; and an information feedback unit 1203 configured to feed back the information on transmission statuses of radio links successfully transmitting the data packets to the transmitting device, or feed back information on transmission rate difference between the plurality of radio links and/or information on scheduling latency difference between the plurality of radio links obtained based on the information on transmission statuses of radio links successfully transmitting the data packets.

In one embodiment, the information on transmission statuses of radio links successfully transmitting the data packets may be included in a PDCP layer status report fed back by the receiving device.

Figure 13:
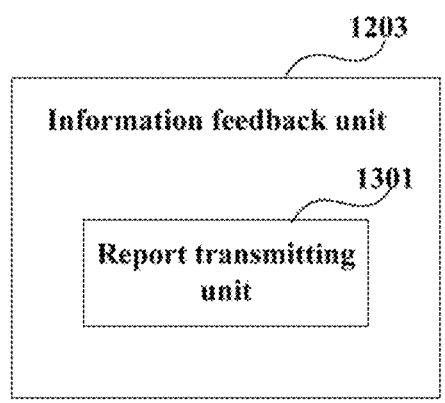
FIG. 13 is a schematic diagram of the information feedback unit of Embodiment 4 of this disclosure.

FIG. 13 is a schematic diagram of the information feedback unit 1203 of the embodiment of this disclosure. As shown in FIG. 13, the information feedback unit 1203 may include:

a report transmitting unit 1301 configured to transmit a PDCP layer status report to the transmitting device, the PDCP layer status report including the information on the transmission statues of the radio links successfully transmitting the data packets.

For example, the PDCP layer status report may include: a bitmap field, one or more bits in the bitmap field indicating a radio link by which each of successfully transmitted data packets is transmitted.

In another embodiment, the information on transmission rate of the plurality of radio links and/or the information on transmission rate difference between the plurality of radio links may be included in the PDCP layer status report fed back by the receiving device.

Figure 14:
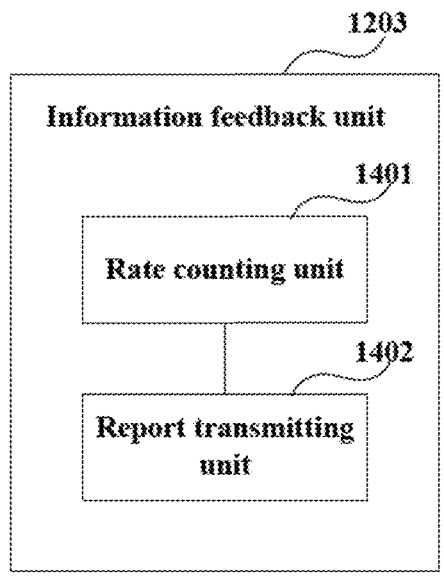
FIG. 14 is another schematic diagram of the information feedback unit of Embodiment 4 of this disclosure.

FIG. 14 is a schematic diagram of the information feedback unit 1203 of the embodiment of this disclosure. As shown in FIG. 14, the information feedback unit 1203 may include:

a rate counting unit 1401 configured to count transmission rates of the plurality of radio links, and obtain information on transmission rate of the plurality of radio links and/or information on transmission rate difference between the plurality of radio links based on a counting result; and a report transmitting unit 1402 configured to transmit a PDCP layer status report to the transmitting device, the PDCP layer status report including the information on transmission rate of the plurality of radio links and/or information on transmission rate difference between the plurality of radio links.

For example, the PDCP layer status report may include: a number-related field, carrying numbers of data packets successfully transmitted by different radio links, and/or carrying a ratio of or a difference between the numbers of data packets successfully transmitted by different radio links.

In another embodiment, the information on transmission rate of the plurality of radio links and/or the information on transmission rate difference between the plurality of radio links may be included in RRC layer signaling fed back by the receiving device.

Figure 15:
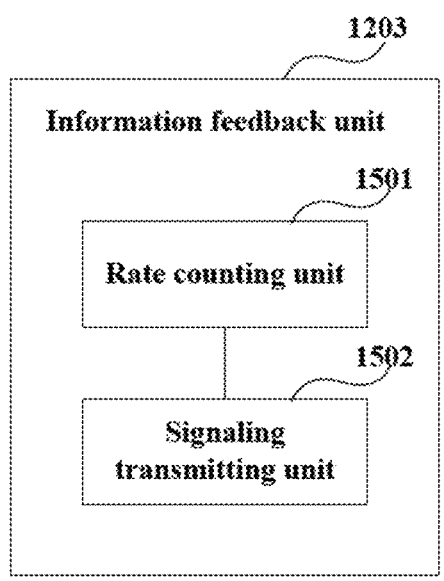
FIG. 15 is a further schematic diagram of the information feedback unit of Embodiment 4 of this disclosure.

FIG. 15 is a schematic diagram of the information feedback unit 1203 of the embodiment of this disclosure. As shown in FIG. 15, the information feedback unit 1203 may include:

a rate counting unit 1501 configured to count transmission rates of the plurality of radio links, and obtain information on transmission rate of the plurality of radio links and/or information on transmission rate difference between the plurality of radio links based on a counting result; and a signaling transmitting unit 1502 configured to transmit an RRC signaling to the transmitting device, the RRC signaling including the information on transmission rate of the plurality of radio links and/or the information on transmission rate difference between the plurality of radio links.

For example, the RRC signaling may include one or more pieces of the following information: indication information on that a ratio of or a difference between the numbers of data packets successfully transmitted by different radio links is greater than a predetermined threshold; the ratio of or the difference between the numbers of data packets successfully transmitted by different radio links; and the numbers of data packets successfully transmitted by different radio links.

It can be seen from the above embodiments that the information on transmission rate difference is obtained according to information on transmission statuses of the radio links successfully transmitting the PDCP layer data packets. Hence, an accurate reference basis may be provided for the transmitting device in determining whether a current network is suitable to performing duplication transmission, gains and losses between wasted radio resources and reduced latency in the multi-connection duplication transmission mode may be better weighted, and a more suitable data transmission mode or flow control mode may be configured.

Embodiment 5

These embodiments of this disclosure provide a communication system, with contents identical to those in embodiments 1-4 being not going to be described herein any further. The communication system transmits data packets by using a plurality of radio links and may include:

a transmitting device configured to obtain information on transmission rate difference and/or information on scheduling latency difference between the plurality of radio links; the information on transmission rate difference is obtained based on information on transmission statuses of radio links successfully transmitting PDCP layer data packets, and the information on scheduling latency difference is obtained based on information on transmission statuses of radio links transmitting RLC layer data packets.

Furthermore, the communication system may further include:

a receiving device configured to, in receiving a PDCP layer data packet transmitted by the transmitting device via the plurality of radio links, record a radio link by which the data packet is successfully transmitted; obtain information on transmission statuses of radio links successfully transmitting the data packets; and feed back the information on transmission statuses of radio links successfully transmitting the data packets to the transmitting device, or feed back information on transmission rate difference between the plurality of radio links and/or information on scheduling latency difference between the plurality of radio links obtained based on the information on transmission statuses of radio links successfully transmitting the data packets.

Figure 16:
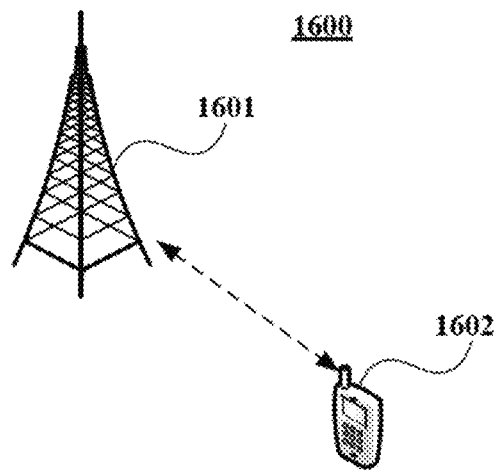
FIG. 16 is a schematic diagram of the communication system of Embodiment 5 of this disclosure.

FIG. 16 is a schematic diagram of the communication system of the embodiment of this disclosure, in which a case where the transmitting device is a base station and the receiving device is a user equipment is shown. As shown in FIG. 16, a communication system 1600 may include a base station 1601 and a user equipment 1602; the base station 1601 may be configured with the transmission status reporting apparatus 700 as described in Embodiment 3, and the user equipment 1602 may be configured with the transmission status reporting apparatus 1200 as described in Embodiment 4.

The embodiment of this disclosure further provides a transmitting device, which may be, for example, a base station or a user equipment. However, this disclosure is not limited thereto, and it may also be other network devices. And following description shall be given by taking a base station as an example.

Figure 17:
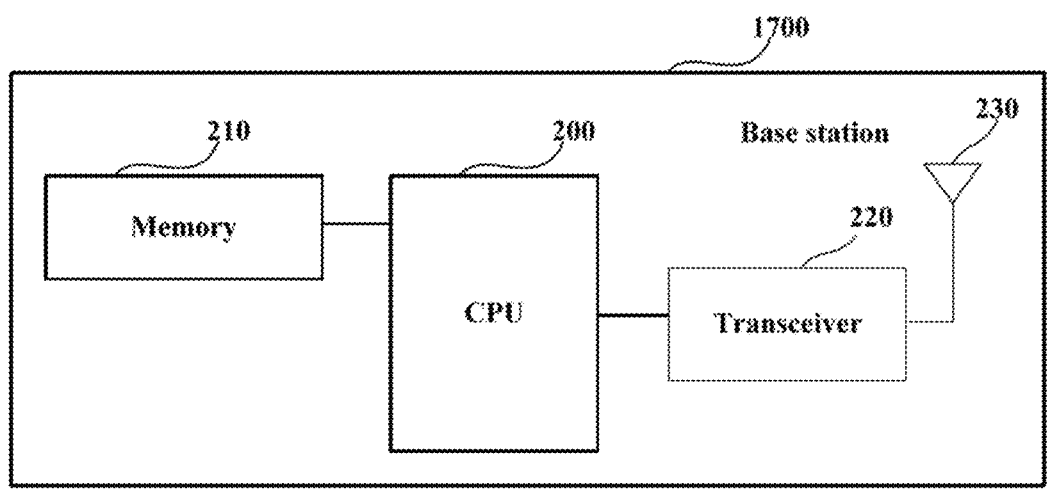
FIG. 17 is a schematic diagram of the base station of Embodiment 5 of this disclosure.

FIG. 17 is a schematic diagram of a structure of the base station of the embodiment of this disclosure. As shown in FIG. 17, a base station 1700 may include a central processing unit (CPU) 200 and a memory 210, the memory 210 being coupled to the central processing unit 200. The memory 210 may store various data, and furthermore, it may store a program for information processing, and execute the program under control of the central processing unit 200. The central processing unit 200 may be configured to carry out the transmission status reporting method described in Embodiment 1.

For example, the central processing unit 200 may be configured to perform following control: obtaining information on transmission rate difference and/or information on scheduling latency difference between the plurality of radio links; the information on transmission rate difference is obtained based on information on transmission statuses of radio links successfully transmitting PDCP layer data packets, and the information on scheduling latency difference is obtained based on information on transmission statuses of radio links transmitting RLC layer data packets.

Furthermore, as shown in FIG. 17, the base station 1700 may include a transceiver 220, and an antenna 230, etc. Functions of the above components are similar to those in the relevant art, and shall not be described herein any further. It should be noted that the base station 1700 does not necessarily include all the parts shown in FIG. 17, and furthermore, the base station 1700 may include parts not shown in FIG. 17, and the relevant art may be referred to.

The embodiment of this disclosure further provides receiving device, which may be, for example, a user equipment or a base station. However, this disclosure is not limited thereto, and it may also be other network devices. And following description shall be given by taking a user equipment as an example.

Figure 18:
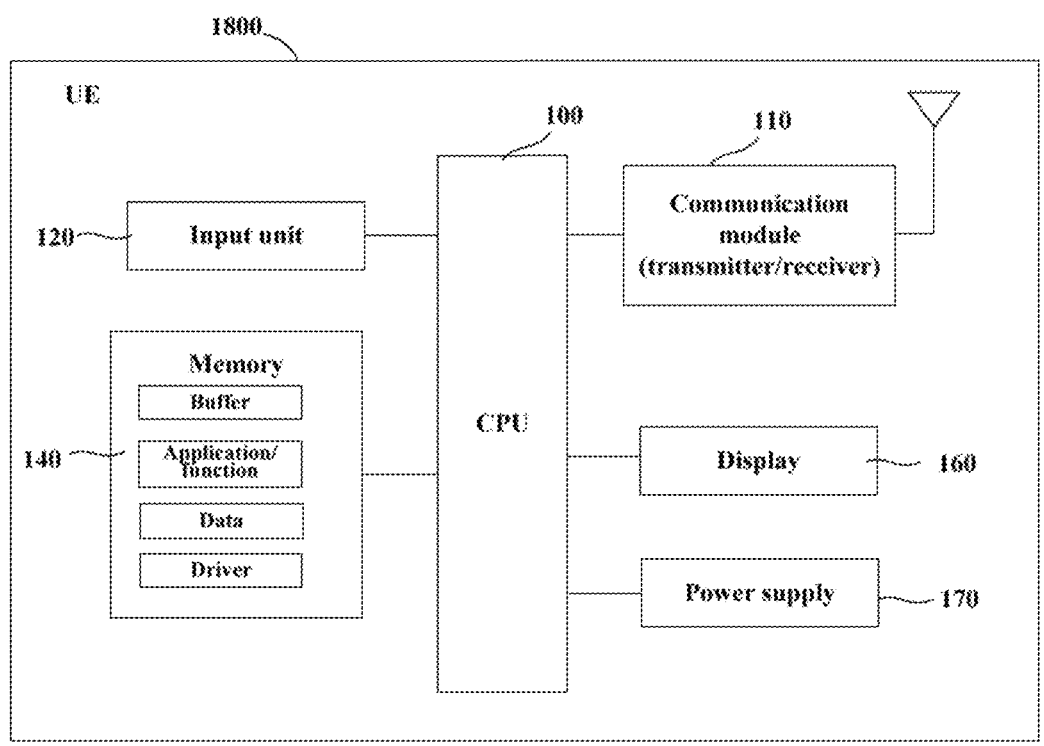
FIG. 18 is a schematic diagram of the user equipment of Embodiment 5 of this disclosure.

FIG. 18 is a schematic diagram of the user equipment of the embodiment of this disclosure. As shown in FIG. 18, a user equipment 1800 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions. The central processing unit 100 may be configured to carry out the transmission status reporting method described in Embodiment 2.

For example, the central processing unit 100 may be configured to perform following control: in receiving a PDCP layer data packet transmitted by a transmitting device via the plurality of radio links, recording a radio link by which the data packet is successfully transmitted; obtaining information on transmission statuses of radio links successfully transmitting data packets; and feeding back the information on transmission statuses of radio links successfully transmitting the data packets, or feeding back information on transmission rate difference between the plurality of radio links and/or information on scheduling latency difference between the plurality of radio links obtained based on the information on transmission statuses of radio links successfully transmitting the data packets.

As shown in FIG. 18, the user equipment 1800 may further include a communication module 110, an input unit 120, a display 160 and a power supply 170. Functions of the above components are similar to those in the relevant art, and shall not be described herein any further. It should be noted that the user equipment 1800 does not necessarily include all the parts shown in FIG. 18, and the above components are not necessary; and furthermore, the user equipment 1800 may include parts not shown in FIG. 18, and the relevant art may be referred to.

The embodiment of this disclosure further provides a transmitting device, which may be, for example, a user equipment, reference being able to be made to FIG. 18 for a structure of the user equipment. The central processing unit 100 may be configured to perform following control: obtaining information on transmission rate difference and/or information on scheduling latency difference between the plurality of radio links; the information on transmission rate difference is obtained based on information on transmission statuses of radio links successfully transmitting PDCP layer data packets, and the information on scheduling latency difference is obtained based on information on transmission statuses of radio links transmitting RLC layer data packets.

The embodiment of this disclosure further provides a receiving device, which may be, for example, a base station, reference being able to be made to FIG. 17 for a structure of the base station. The central processing unit 200 may be configured to perform following control: in receiving a PDCP layer data packet transmitted by a transmitting device via the plurality of radio links, recording a radio link by which the data packet is successfully transmitted; obtaining information on transmission statuses of radio links successfully transmitting data packets; and feeding back the information on transmission statuses of radio links successfully transmitting the data packets, or feeding back information on transmission rate difference between the plurality of radio links and/or information on scheduling latency difference between the plurality of radio links obtained based on the information on transmission statuses of radio links successfully transmitting the data packets.

An embodiment of the present disclosure provides a computer readable program, which, when executed in a transmission status reporting apparatus or a transmitting device, will cause the transmission status reporting apparatus or the transmitting device to carry out the transmission status reporting method described in Embodiment 1.

An embodiment of the present disclosure provides a computer storage medium, including a computer readable program, which will cause a transmission status reporting apparatus or a transmitting device to carry out the transmission status reporting method described in Embodiment 1.

An embodiment of the present disclosure provides a computer readable program, which, when executed in a transmission status reporting apparatus or a receiving device, will cause the transmission status reporting apparatus or the receiving device to carry out the transmission status reporting method described in Embodiment 2.

An embodiment of the present disclosure provides a computer storage medium, including a computer readable program, which will cause a transmission status reporting apparatus or a receiving device to carry out the transmission status reporting method described in Embodiment 2.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 7 may either correspond to software modules of procedures of a computer program, or correspond to hardware modules. Such software modules may respectively correspond to the steps shown in FIG. 1. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A transmission status reporting apparatus, configured in a transmitting device for transmitting data packets by using a plurality of radio links, the transmission status reporting apparatus comprising:
a memory that stores a plurality of instructions; and
processor circuitry that couples to the memory and that is configured to execute the instructions to:
obtain information on transmission rate difference and/or information on scheduling latency difference between the plurality of radio links;
wherein, the information on transmission rate difference is obtained based on information on transmission statuses of radio links successfully transmitting packet data convergence protocol layer data packets, and/or the information on scheduling latency difference is obtained based on information on transmission statuses of radio links transmitting radio link control layer data packets, and
wherein the processor circuitry in the transmission status reporting apparatus is further configured to determine whether to continue to perform duplication transmission of the data packets by using the plurality of radio links, according to the information on transmission rate difference and/or the information on scheduling latency difference.

2. The transmission status reporting apparatus according to claim 1, wherein the processor circuitry is further configured to:
receive a packet data convergence protocol layer status report fed back by a receiving device, the packet data convergence protocol layer status report containing the information on transmission statuses of radio links successfully transmitting the data packets;
count transmission rates of the plurality of radio links based on the packet data convergence protocol layer status report; and
obtain the information on transmission rate difference between the plurality of radio links according to a counting result.

3. The transmission status reporting apparatus according to claim 2, wherein the packet data convergence protocol layer status report comprises: a bitmap field, one or more bits in the bitmap field indicating a radio link by which each of successfully transmitted data packets is transmitted.

4. The transmission status reporting apparatus according to claim 1, wherein the processor circuitry is further configured to:
receive a packet data convergence protocol layer status report fed back by a receiving device, the packet data convergence protocol layer status report containing information on transmission rate of the plurality of radio links and/or the information on transmission rate difference between the plurality of radio links; and
obtain the information on transmission rate difference between the plurality of radio links according to the packet data convergence protocol layer status report.

5. The transmission status reporting apparatus according to claim 4, wherein the packet data convergence protocol layer status report comprises: a number-related field, carrying numbers of data packets successfully transmitted by different radio links, and/or carrying a ratio of or a difference between the numbers of data packets successfully transmitted by different radio links.

6. The transmission status reporting apparatus according to claim 1, wherein the processor circuitry is further configured to:
receive radio resource control signaling fed back by a receiving device, the radio resource control signaling comprising information on transmission rate of the plurality of radio links and/or the information on transmission rate difference between the plurality of radio links; and
obtain the information on transmission rate difference between the plurality of radio links according to the radio resource control signaling.

7. The transmission status reporting apparatus according to claim 6, wherein the radio resource control signaling comprises one or more pieces of the following information: indication information on that a ratio of or a difference between the numbers of data packets successfully transmitted by different radio links is greater than a predetermined threshold; the ratio of or the difference between the numbers of data packets successfully transmitted by different radio links; and the numbers of data packets successfully transmitted by different radio links.

8. The transmission status reporting apparatus according to claim 1, wherein the processor circuitry is further configured to:
  when a radio link control layer of each of the radio links of the transmitting device transfers the data packets to a lower layer, indicate a packet data convergence protocol layer of transmission information on that the data packets have been transmitted by the radio link control layer; and
  obtain scheduling latency information on different radio links in transmitting the data packets by the packet data convergence protocol layer according to the transmission information.

9. The transmission status reporting apparatus according to claim 8, wherein the processor circuitry is further configured to:
  count a difference between times of transmitting a plurality of data packets in different radio links; and
  obtain the information on scheduling latency difference between the plurality of radio links according to a counting result.

10. A transmission status reporting apparatus, configured in a receiving device for transmitting data packets by using a plurality of radio links, the transmission status reporting apparatus comprising:
  a memory that stores a plurality of instructions; and
  processor circuitry that couples to the memory and that is configured to execute the instructions to:
    in receiving a packet data convergence protocol layer data packet transmitted by a transmitting device via the plurality of radio links, record a radio link by which the data packet is successfully transmitted;
    obtain information on transmission statuses of radio links successfully transmitting data packets; and
    feed back the information on transmission statuses of radio links successfully transmitting the data packets to the transmitting device, or feed back information on transmission rate difference between the plurality of radio links and/or information on scheduling latency difference between the plurality of radio links obtained based on the information on transmission statuses of radio links successfully transmitting the data packets,
  wherein the transmitting device is configured to determine whether to continue to perform duplication transmission of the data packets by using the plurality of radio links, according to the information on transmission rate difference and/or the information on scheduling latency difference.

11. The transmission status reporting apparatus according to claim 10, wherein the processor circuitry is further configured to:
  feed back a packet data convergence protocol layer status report to the transmitting device, the packet data convergence protocol layer status report containing information on transmission statuses of radio links successfully transmitting the data packets.

12. The transmission status reporting apparatus according to claim 11, wherein the packet data convergence protocol layer status report comprises: a bitmap field, one or more bits in the bitmap field indicating a radio link by which each of successfully transmitted data packets is transmitted.

13. The transmission status reporting apparatus according to claim 10, wherein the processor circuitry is further configured to:
  count transmission rates of the plurality of radio links, and obtain information on transmission rate of the plurality of radio links and/or information on transmission rate difference between the plurality of radio links based on a counting result; and
  transmit a packet data convergence protocol layer status report to the transmitting device, the packet data convergence protocol layer status report comprising information on transmission rate of the plurality of radio links and/or the information on transmission rate difference between the plurality of radio links.

14. The transmission status reporting apparatus according to claim 13, wherein the packet data convergence protocol layer status report comprises: a number-related field, carrying numbers of data packets successfully transmitted by different radio links, and/or carrying a ratio of or a difference between the numbers of data packets successfully transmitted by different radio links.

15. The transmission status reporting apparatus according to claim 10, wherein the processor circuitry is further configured to:
  count transmission rates of the plurality of radio links, and obtain information on transmission rate of the plurality of radio links and/or information on transmission rate difference between the plurality of radio links based on a counting result; and
  transmit a radio resource control signaling to the transmitting device, the radio resource control signaling comprising information on transmission rate of the plurality of radio links and/or the information on transmission rate difference between the plurality of radio links.

16. The transmission status reporting apparatus according to claim 15, wherein the radio resource control signaling comprises one or more pieces of the following information: indication information on that a ratio of or a difference between the numbers of data packets successfully transmitted by different radio links is greater than a predetermined threshold; the ratio of or the difference between the numbers of data packets successfully transmitted by different radio links; and the numbers of data packets successfully transmitted by different radio links.

17. A communication system, transmitting data packets by using a plurality of radio links, the communication system comprising:
  a transmitting device configured to obtain information on transmission rate difference and/or information on scheduling latency difference between the plurality of radio links; wherein, the information on transmission rate difference is obtained based on information on transmission statuses of radio links successfully transmitting packet data convergence protocol layer data packets, and/or the information on scheduling latency difference is obtained based on information on transmission statuses of radio links transmitting radio link control layer data packets,
  wherein the transmitting device is further configured to determine whether to continue to perform duplication transmission of the data packets by using the plurality of radio links, according to the information on transmission rate difference and/or the information on scheduling latency difference.

18. The communication system according to claim 17, wherein the communication system further comprises:
  a receiving device configured to, in receiving a packet data convergence protocol layer data packet transmitted by the transmitting device via the plurality of radio links, record a radio link by which the data packet is successfully transmitted; obtain information on transmission statuses of radio links successfully transmitting the data packets; and feed back the information on transmission statuses of radio links successfully transmitting the data packets to the transmitting device, or feed back information on transmission rate difference between the plurality of radio links and/or information on scheduling latency difference between the plurality of radio links obtained based on the information on transmission statuses of radio links successfully transmitting the data packets.

* * * * *